July 15, 1969  D. R. LARSEN  3,455,408
MISSILE CARRIER ELECTRONIC STEERING CIRCUIT
Filed Nov. 21, 1966
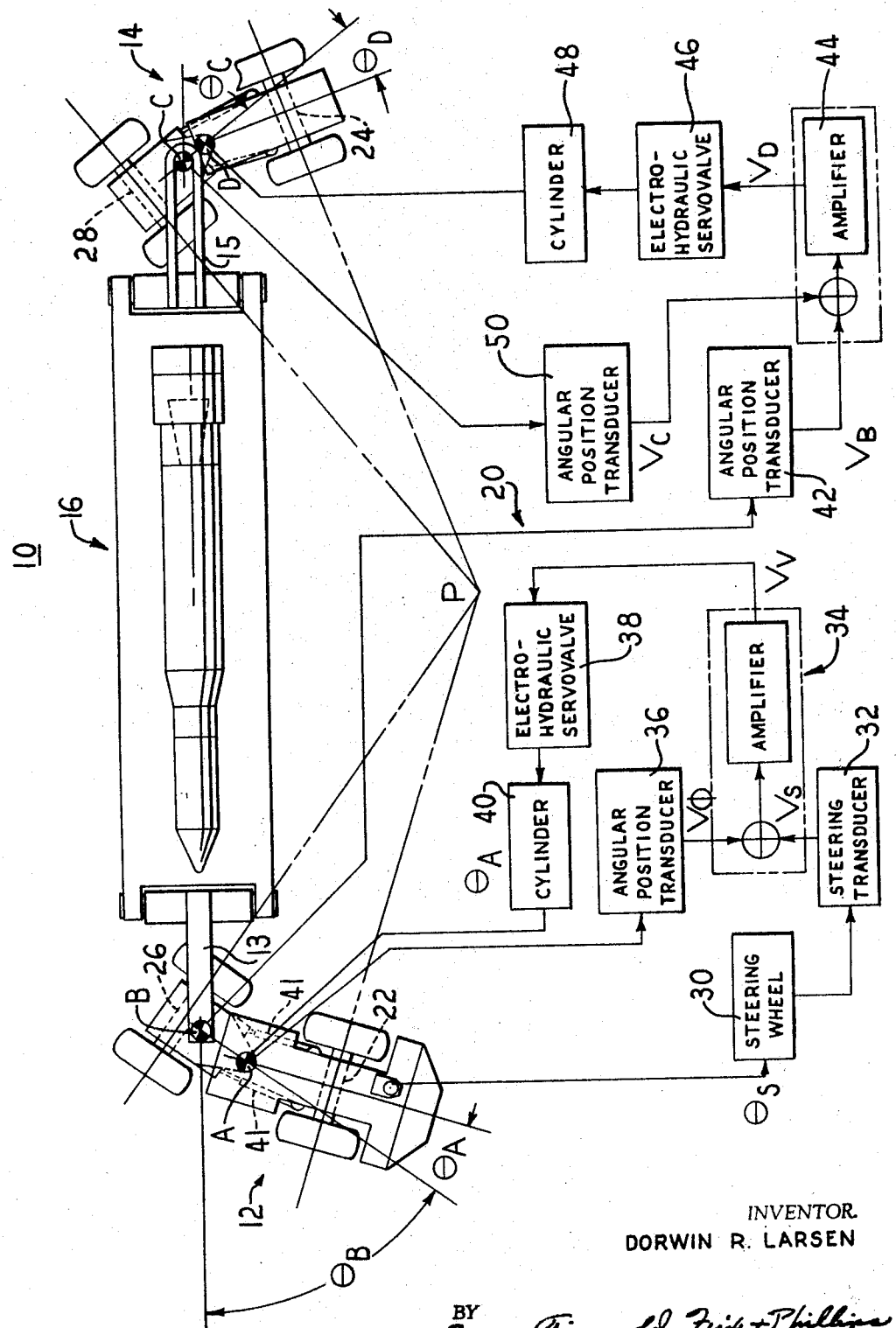
INVENTOR.
DORWIN R. LARSEN
BY
ATTORNEYS United States Patent Office 3,455,408
Patented July 15, 1969

3,455,408
MISSILE CARRIER ELECTRONIC
STEERING CIRCUIT
Dorwin R. Larsen, Washington, Ill., assignor to
Caterpillar Tractor Co., Peoria, Ill., a corporation of California
Filed Nov. 21, 1966, Ser. No. 595,951
Int. Cl. B62d 5/06, 5/04
U.S. Cl. 180—79.2                             4 Claims

ABSTRACT OF THE DISCLOSURE

In vehicles having a load carrying platform supported between two articulated tractor units, steering from a single station with optimum tracking of the vehicle requires a certain relationship between certain parts of the respective articulated tractor units and longitudinal axis of the load carrying platform, rather than equal or similar articulated angles in the respective tractor units. Suitable relationships between the respective tractor parts and the load carring platform can be established by steering the front tractor through an electro-hydraulic servo loop, sensing the relationship between the front tractor relative the platform with a transducer and employing the transducer output signal to automatically control the articulation of the rear tractor unit continuously to establish the proper relationship between one of its parts and the platform.

---

The present invention relates to vehicle electronic steering mechanisms and more particularly to an electronic steering mechanism for a double-ender vehicle, of the type for example which employs articulated tractors on either end of a load supporting center section.

Heretofore large double-ender vehicles such as the dual tractor missile carrying vehicle have required the use of two operators; one to control the front tractor and one to control the rear tractor. The overall length of such vehicles ranges from 150 to 250 feet, wherein the extreme length between the tractors tends to compound the difficulty of steering and tracking, and imposes the requirement of greater control sensitivity on equipment utilized in tracking.

Accordingly, it is an object of the invention to provide a relatively simple, electronic steering mechanism for double-ender vehicles wherein a single operator may accurately steer the vehicle.

It is another object of the invention to provide an electronic steering mechanism for double-ender vehicles which provides accurate tracking between a front and a rear tractor of the vehicle.

It is still another object of the invention to provide an electronic steering mechanism for double-ender vehicles which senses selected angles between the steering wheel, the articulated tractors and/or the load supporting center section, and introduces voltages representative of the angles to associated hydraulic systems to control the degree and extent of the angles.

Other objects and advantages will be apparent from the following specification taken in conjunction with the drawing, in which the single figure is a schematic, block diagram of an electro-hydraulic circuit of the invention as utilized in conjunction with a double-ender missile carrying vehicle.

Referring to the drawing, a missile carrying vehicle 10 has a front tractor 12 and a rear tractor 14 coupled in pivotable relation at points B and C at respective ends of a missile supporting center section 16 by means of gooseneck arrangements 13 and 15, respectively. When driven, the vehicle 10 as shown will travel about a point P, thus providing optimized tracking of the front and rear tractors 12, 14, respectively, and providing the best steering radius for this particular vehicle and application. The relative angles imparted to the tractors 12, 14, relative to the center section 16, are determined and controlled by an electronic steering mechanism 20 in accordance with the invention.

A steering axle 22 of the front tractor 12 is controlled by a single operator, and a steering axle 24 of the rear tractor 14 is controlled by the relative positions of free steering axles 26 and 28 of the front and rear tractors respectively. Each of the four axles 22, 24, 26 and 28 is powered and pivots about either point A or point D. The positions of the two additional pivot points B and C are chosen on the basis of weight factors of the missile and missile carrying center section 16, and are accordingly connected to the frame of the respective front and rear tractors 12 and 14. As may be seen from the figure, the pivots A and B are spaced a greater distance apart than pivots C and D, and such configuration and design again is determined by the weight distribution of the missile and carrier vehicle.

The vehicle 10 is controlled by a single operator in the front tractor 12, by rotating and thus positioning a steering wheel 30 to an angle $\theta_s$ corresponding to the desired vehicle direction of travel. The angle $\theta_s$ of steering wheel 30 is sensed by a steering transducer means 32 which produces an electrical voltage $V_s$ proportional to angle $\theta_s$. The voltage $V_s$ is introduced from the transducer means 32 to a voltage comparator means 34. An angular position transducer means 36 is coupled to pivot point A and senses an angle $\theta_A$ which is the angle between a perpendicular to axle 22 and a perpendicular to axle 26. The transducer means 36 produces an electrical voltage $V_\phi$ proportional to the angle $\theta_A$. Thus voltage comparator means 34 has two voltages $V_s$ and $V_\phi$ introduced thereto, and in response thereto provides an output voltage $V_v$ therefrom which is the difference between the two input voltages. The difference voltage $V_v$ is introduced to an electro-hydraulic control circuit comprised for example of an electro-hydraulic servovalve 38, which is connected to and operable on a hydraulic cylinder means 40. The cylinder means 40, although shown here as a block, is actually mounted on the front tractor 12 (as depicted by way of example only by cylinders 41) between the two frame members thereof, and thus acts upon the pivot point A to reposition the articulated front tractor axles 22 and 26. As previously mentioned, the angle $\theta_A$ is sensed by the angular position transducer means 36, and a difference voltage $V_v$ is supplied to the cylinder means 40 until the voltage $V_\phi$ corresponding to angle $\theta_A$ is equal to the steering voltage $V_s$ introduced by the operator, and the voltages $V_\phi$ and $V_s$ null in a selected relationship.

An angular position transducer means 42 is coupled to the front tractor 12 and particularly pivot point B and measures an angle $\theta_B$ to provide a voltage $V_B$ corresponding to the angle $\theta_B$ which describes an angle measured from the center line of the missile carrying center section 16, to the perpendicular of the axle 26. The voltage $V_B$ is introduced to a voltage comparator means 44 which provides a difference output voltage $V_D$ to a second electro-hydraulic control circuit comprised of an electro-hydraulic servovalve 46 similar to servovalve 38, which in turn operates a hydraulic cylinder means 48 to reposition the rear tractor axles 24 and 28 about pivot point D. An angular position transducer means 50 is coupled to pivot point C and sense an angle $\theta_C$ between the center line of the missle carrying center section 16 and a perpendicular to the axle 28 and supplies a voltage $V_C$ proportional to the angle $\theta_C$ to the comparator means 44 as a second input thereto. Voltage comparator means 44 compares the incoming voltages $V_B$ and $V_C$ and provides the output voltage $V_D$ as long as a difference exists between the two incoming voltages $V_B$, $V_C$. At such time as the voltages $V_B$ and $V_C$ null, voltage $V_D$ is zero and the angle $\theta_C$ of the rear tractor 14 is equal to the angle $\theta_B$ of the front tractor 12 and the two tractors are positioned at the proper angle for exact tracking. The angle $\theta_D$ which is shown in the figure and which describes the angle between the two perpendiculars to the axles 28 and 24, is not per se critical in providing tracking of the described vehicle 10 and thus is not sensed. However, it is to be understood that if desired the angle $\theta_D$ could be sensed and fed to suitable components to provide additional control. The angle $\theta_D$ generally describes an angle of from 0° to 30°, and an appropriate blocking means (not shown) is provided to prevent $\theta_D$ from increasing beyond 30°. Note that although the angle $\theta_D$ is not sensed and used as a feedback signal, by driving it to a preselected value via cylinder means 48 the angle $\theta_C$ of the rear tractor 14 is determined.

Accordingly, the electronic steering mechanism of the invention operates to maintain a preselected relationship between the angles $\theta_B$ and $\theta_C$ of the front and rear tractors 12 and 14, respectively, to permit optimum tracking of the articulated tractors about a circumferential path having the point P as its center. This eliminates the need for a second operator in the rear tractor 14 and the need for extensive communications therebetween to maintain the desired angles $\theta_B$ and $\theta_C$ for optimum tracking.

The various components shown herein which comprise the overall schematic block diagram of the figure, such as the various transducer means 32, 36, 42 and 50 and the servovalves 38 and 46, are generally well known in the art of electro-hydraulics and are accordingly not further described herein.

What is claimed is:

1. An electronic steering apparatus for controlling the tracking of front and rear articulated tractors of a double-ender load carrying vehicle, wherein the front and rear tractors are pivotally coupled to the ends of a load carrying center section of the vehicle, the combination comprising:
   steering means on said front tractor operable by a single operator for steering said vehicle;
   first electro-hydraulic means operatively coupled to said steering means and said front tractor and operable for pivoting same about its respective pivot point to control the angle of the front tractor relative to the center section;
   sensing means connected between said front tractor and said load carrying center section to sense the instantaneous tracking angle of said front tractor relative to said load carrying center section; and
   second electro-hydraulic means coupled to said rear tractor receiving signals corresponding to the instantaneous tracking angle from said sensing means and operatively coupled for pivoting the rear tractor about its respective pivot point to conform the angle of said rear tractor to the angle for optimum tracking.

2. The electronic steering apparatus of claim 1 wherein the sensing means further comprises first angular position transducer means coupled to said front tractor to sense said instantaneous tracking angle thereof with respect to said center section, first comparator means coupled to said first angular position transducer means and to said steering means, and first control means coupled between said comparator means and said front tractor to pivot the front tractor through said instantaneous tracking angle to the angle predetermined by the operator via said steering means.

3. A single station steering electronic apparatus for controlling front and rear articulated tractors of a vehicle having its center portion supported between said tractors comprising:
   manually actuated steering means located on said front articulated tractors;
   first electro-hydraulic means coupled to said steering means and said front tractor operable to control the articulation of said front tractor in response to manual actuation of said steering means;
   transducer means connected with said front tractor and said center portion of said vehicle and operable to sense the relative position of the same and convert it to an output signal; and
   second electro-hydraulic means connected to said transducer and said rear articulated tractor and operable to automatically control the articulation of said rear tractor in response to said output signal whereby a relationship for optimum tracking is established between the respective tractors and said center portion of said vehicle.

4. The steering apparatus as defined in claim 3 wherein the transducer means includes means to continuously articulate the rear tractor by the second electro-hydraulic means to obtain the same angle between its inboard portion and the center portion that is established between the inboard portion of the front tractor and said center portion whereby optimum steering is effected.

References Cited

UNITED STATES PATENTS 3,246,714    4/1966    Middlesworth et al. ___ 180—14
3,280,931    10/1966    Cahill et al. _____ 180—14 X BENJAMIN HERSH, Primary Examiner JOHN A. PEKAR, Assistant Examiner